United States Patent
Dalbert

(10) Patent No.: US 11,083,657 B2
(45) Date of Patent: Aug. 10, 2021

(54) PATIENT TRANSFER SYSTEM

(71) Applicant: TRUMPF MEDIZIN SYSTEME GMBH + CO. KG, Saalfeld (DE)

(72) Inventor: Heinz-Hermann Dalbert, Bruckmuehl (DE)

(73) Assignee: TRUMPF MEDIZIN SYSTEME GMBH + CO. KG, Saalfeld (DE)

(*) Notice: Subject to any disclaimer, the term of this patent is extended or adjusted under 35 U.S.C. 154(b) by 67 days.

(21) Appl. No.: 16/555,300

(22) Filed: Aug. 29, 2019

(65) Prior Publication Data

US 2020/0069494 A1    Mar. 5, 2020

(30) Foreign Application Priority Data

Sep. 3, 2018  (EP) .................................. 18192270.9

(51) Int. Cl.
- *A61G 7/10* (2006.01)
- *B25J 15/00* (2006.01)
- *B25J 11/00* (2006.01)

(52) U.S. Cl.
CPC ............. *A61G 7/1057* (2013.01); *A61G 7/10* (2013.01); *A61G 7/1013* (2013.01); *A61G 7/1017* (2013.01); *B25J 11/009* (2013.01); *B25J 15/0014* (2013.01); *B25J 15/0028* (2013.01); *A61G 7/1032* (2013.01)

(58) Field of Classification Search
CPC ...... A61G 7/10; A61G 7/1013; A61G 7/1057; A61G 7/1021; A61G 7/1017; A61G 7/1046; A61G 7/1032; B25J 15/0014; B25J 15/0028

See application file for complete search history.

(56) References Cited

U.S. PATENT DOCUMENTS

| | | | |
|---|---|---|---|
| 6,971,126 B1* | 12/2005 | Kluckhuhn | A61G 7/1032 5/81.1 R |
| 8,042,208 B2* | 10/2011 | Gilbert | A61G 13/04 5/607 |
| 2008/0066228 A1 | 3/2008 | Kume et al. | |
| 2011/0074407 A1* | 3/2011 | Ladebeck | A61B 6/037 324/261 |
| 2011/0238217 A1* | 9/2011 | Kume | A61G 7/1032 700/275 |
| 2015/0182403 A1* | 7/2015 | Lim | A61G 7/1025 5/86.1 |

* cited by examiner

*Primary Examiner* — David R Hare
*Assistant Examiner* — Madison Emanski
(74) *Attorney, Agent, or Firm* — Barnes & Thornburg LLP

(57) ABSTRACT

A patient transfer system is provided. The patient transfer system comprises a lifting mechanism, an actuator unit attached to the lifting mechanism, two conveyors attached to the actuator unit such that they extend from the actuator unit in a forklift fork-like manner, wherein the conveyors respectively have a conveyor belt and opposite reversing ends reversing the conveyor belt. The actuator unit is configured to move the conveyors such that the reversing ends facing each other are linearly movable towards and apart from each other.

14 Claims, 4 Drawing Sheets

PATIENT TRANSFER SYSTEM

CROSS-REFERENCE TO RELATED APPLICATIONS

This application claims the benefit of European Patent Application Serial No. 18192270.9, filed on Sep. 3, 2018, the entire disclosure of which is incorporated herein by reference in its entirety.

BACKGROUND

The invention relates to a patient transfer system, in particular to a patient transfer system for immobile and badly injured patients, especially in an operating room.

A lot of different kinds of patient transfer systems are known. For example, roller boards, mechanically driven belt systems, hoover mats and lift systems are known. However, these patient transfer systems have the disadvantage that they are too complicated to handle, they do not sufficiently cover a patient weight, they require too many steps in a work flow, or they need too much preparation time and man power to prepare a transfer. Moreover, they are difficult in view of a hygienic aspect.

SUMMARY

In document US 2015/0182403 A1, a mobile robotic lifting and transferring system for bariatric patients is disclosed, however, this system is not suitable for badly injured patients since taking a patient onto the system takes a long time and there is a risk that the patient is pushed from a bed, an operating table or a stretcher. Moreover, there is the risk that a condition of a patient injured at the spine is worsened.

Therefore, the object underlying the invention is to provide a patient transfer system and a method for transferring a patient overcoming the above-mentioned disadvantageous and enabling a quick and safe transfer or handling of patients.

The object is achieved by a patient transfer system according to claim 1 and a method according to claim 14. Advantageous further developments are included in the dependent claims.

A patient transfer system according to an aspect of the invention comprises a lifting mechanism, an actuator unit attached to the lifting mechanism, two conveyors attached to the actuator unit such that they extend from the actuator unit in a forklift fork-like manner, the conveyors respectively having a conveyor belt and opposite reversing ends reversing the conveyor belt, wherein the actuator unit is configured to move the conveyors such that the reversing ends facing each other are linearly moved to each other and apart from each other.

The forklift fork-like manner of attaching the conveyors to the actuator unit provides the two conveyors such that they are disposed in a parallel or almost parallel arrangement. Furthermore, they extend from the actuator unit in a horizontal or almost horizontal direction. The conveyors respectively have a conveyor belt having a conveying direction such that reversing ends of the two conveyors are disposed such that, in the conveying direction, there are reversing ends facing each other and reversing ends averting from another.

By such a patient transfer system, it is possible to move the conveyors, along a longitudinal side of a patient lying on a patient support, e.g. a bed, an operating table, etc., respectively beside the patient. This can be done by horizontally moving the conveyors or the patient support, by vertically moving the conveyors or the patient support or by a superimposed horizontal and vertical motion of the conveyors and/or of the patient support without contacting the patient.

Subsequently, by moving the conveyors such that the reversing ends facing each other are linearly moved towards each other, a quick conveying of the patient onto the conveyors is possible since the conveyors are to be moved merely maximum to a center axis of the patient's body which is a quite short motion and the conveyors can be preferably moved simultaneously.

Due to the provision of the conveyors with the conveyor belts movable with respect to the motion of the conveyors towards and apart from each other, during accommodation of the patient's body on the conveyors, the patient's body does not slide on the patient transfer system but it is conveyed without sliding so that there is no relative motion between the patient's body and the conveyor belt which would have a disadvantageous effect to the patient or which would disturb accommodation of the patient. The same effects assist when unloading the patient from the patient transfer system. Thus, the patient can be accommodated on and unloaded from the patent transfer system in a quick and safe manner.

In an advantageous implementation of the patient transfer system, the patient transfer system comprises a drive device driving the two conveyor belts in respective conveying directions opposite to each other.

When providing a drive device driving the conveyor belts, the accommodation of the patient's body onto the conveyors and unloading from the conveyors can be assisted since a potential friction force between the conveyor belts and the surface of the patient support can be compensated such that conveying motion of the conveyor belts can exactly conform to the motion of the reversing ends facing each other to each other and apart from each other. Thus, accommodating on and unloading from the conveyors of the patient can be performed with a reduced risk of squeezing the patient or his cloths.

In a further advantageous implementation of the patient transfer system, the actuator unit comprises a locking device for locking the conveyors in positions after being moved towards each other.

By such a locking device, the conveyors can be locked in the positions moved to each other such that the conveyors can be prevented from moving apart when the patient is lying on the patient transfer system. Therefore, a further enhanced safety when transferring the patient is possible.

In another advantageous implementation of the patient transfer system, the patient transfer system comprises a sensor for detecting positions of the conveyors in a state after being moved towards each other.

Upon providing the sensor for the state moved to each other, it is possible to start a lifting motion only after the conveyors are in this state which also enhances safety when transferring the patient.

In a further advantageous implementation of the patient transfer system, the patient transfer system comprises a sensor for detecting positions of the conveyors in a state after being moved apart from each other.

By providing such a sensor, a lifting motion of the conveyors can be configured to be blocked until the conveyors are moved apart from each other so that it is ensured that the conveyors have released the patient's body and the body is not unintentionally touched or partially elevated by the conveyors.

In a further advantageous implementation of the patient transfer system, the actuator unit is attached to the lifting mechanism in a manner rotatable around a horizontal axis perpendicular to motion directions towards and apart from each other of the reversing ends of the conveyors facing each other.

When rotating the actuator unit together with the attached conveyors, a selected orientation of the patient's body with respect to its longitudinal axis is possible. Therefore specific positioning up to a prone position, e.g., on an operating table is possible.

In a further advantageous implementation of the patient transfer system, an apex line of one of the reversing ends facing each other and an apex line of one of the reversing ends averted from each other of one of the conveyors respectively form a conveyor plane of the one of the conveyors, and, on a side accommodating a patient, the conveyor planes of the two conveyors encompass an obtuse angle.

Due to the obtuse angle, in an orientation of the actuation unit in which the conveyors are horizontally moved towards and apart from each other, the conveyor planes confine an angle with a horizontal direction such that the reversing ends facing each other are located lower than the reversing ends averting from each other. Thus, merely the reversing ends facing each other contact the surface of the patient support and they can immerse into a resilient surface of e.g. the bed which assists in preventing squeezing the patient's body.

In a further advantageous implementation of the patient transfer system, the conveyors are supported such that they are movable in parallel to the respective conveyor plane to enable the movement of the reversing ends facing each other towards and apart from each other.

When moving along the conveyor plane, immersing of the reversing ends facing each other is assisted and a risk for squeezing of the patient's body is further reduced.

In a further advantageous implementation of the patient transfer system, the conveyors respectively comprise a support structure, and the conveyor belt and the support structure, at least in the region of the conveyor belt, are made of a material permeable to X-rays.

Due to such a configuration of the conveyors, it is possible to accommodate a patient, e.g. from a stretcher, and to easily perform medical examinations, e.g. an x-ray scan in CAT scanner, before transferring him to a suitable next patient support, e.g. a hospital bed or an operating table.

In a further advantageous implementation of the patient transfer system, the patient transfer system comprises a running gear, attached to the lifting mechanism, for moving the patient transfer system.

By this configuration, a flexible transfer from one patient support to another one is possible and the patient transfer system can be stowed away, e.g. in an operating theater, such that it does not disturb the workflow.

In a further advantageous implementation of the patient transfer system, the running gear comprises a drive mechanism for moving the patient transfer system.

Upon providing the running gear with a drive mechanism, an easy and exact positioning of the patient transfer system and, therefore, of the patient is possible.

In a further advantageous implementation of the patient transfer system, the lifting mechanism comprises a robot arm.

Due to the use of the robot arm, within the operating range of the arm, an easy and exact positioning in any intended position and orientation is possible.

In a further advantageous implementation of the patient transfer system, the robot arm comprises an electromechanical drive or a hydraulic drive.

The electromechanical drive and the hydraulic drive enable an effective way of providing a necessary force for lifting and positioning the patient, wherein the electromechanical drive has further advantages in achieving an exact positioning of the actuating unit.

A method according to an aspect of the invention comprises the steps: placing the conveyors beside a patient, moving the reversing ends of the conveyors facing each other horizontally towards each other by the actuator unit, thereby inserting the conveyors in a space between the patient and a patient support and conveying the patient onto the conveyor belts, lifting the actuator unit by the lifting mechanism, moving the patient transfer system to another patient support or exchanging the patient support, lowering the actuator unit by the lifting mechanism and moving the conveyors apart from each other by the actuator unit, thereby removing the conveyors from the space between the patient and the patient support and conveying the patient from the conveyor belts.

By this method, the patient can be accommodated on and unloaded from the patent transfer system in a quick and safe manner.

In an advantageous implementation of the method, the moving of the reversing ends facing each other of the conveyors horizontally to each other by the actuator unit, thereby inserting the conveyors in a space between the patient and a patient support and conveying the patient onto the conveyor belts, is performed by moving the conveyors parallel to a respective conveyor plane formed by an apex line of one of the reversing ends facing each other and an apex line of one of the reversing ends averted from each other of one of the conveyors, wherein, towards a space between the conveyors, the conveyor planes are downwardly directed.

By this method, merely the reversing ends facing each other contact the surface of the patient support and immersing of the reversing ends facing each other into the resilient surface of e.g. the bed is assisted which helps preventing squeezing the patient's body.

In a further advantageous implementation of the method, it includes the step: driving the conveyor belts by a drive device in conveying directions having a horizontal component opposite to the horizontal motion component of the motion of the respective conveyor.

Upon including this step, the accommodation of the patient's body onto the conveyors and unloading from the conveyors can be assisted since a potential friction force between the conveyor belts and the surface of the patient support can be compensated such that conveying motion of the conveyor belts can exactly correspond to the motion towards and apart from each other of the reversing ends facing each other.

The invention is now elucidated in detail by means of embodiments referring to the attached drawings.

BRIEF DESCRIPTION OF THE DRAWINGS

In particular.

DETAILED DESCRIPTION OF THE DRAWINGS

Figure 1:
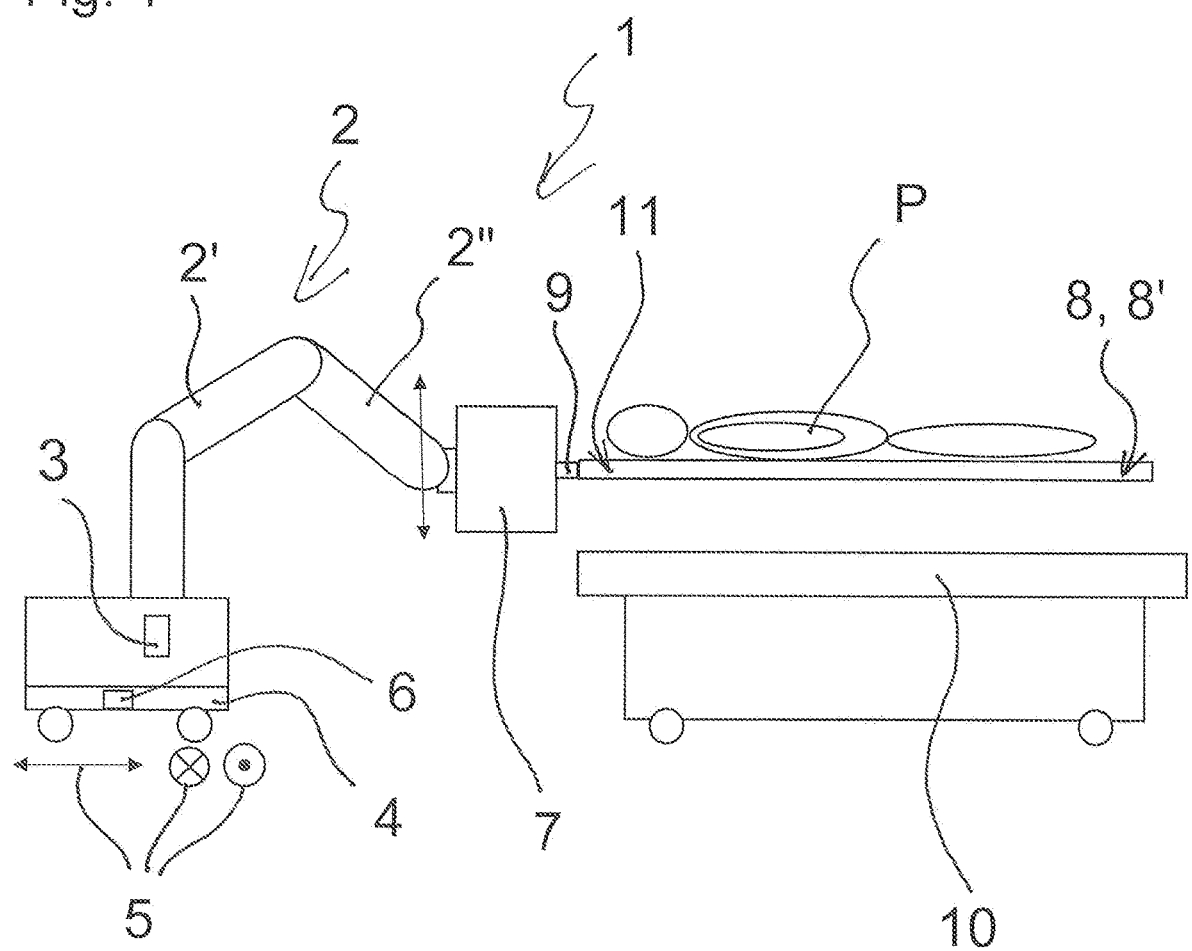
FIG. 1 shows a side view of a principle illustration of a patient transfer system according to the invention.

FIG. 1 shows a side view of a principle illustration of a patient transfer system 1 according to the invention.

The patient transfer system 1 comprises a lifting mechanism 2. In the present embodiments, the lifting mechanism 2 comprises a robot arm provided with single robot arms 2', 2''. Alternatively, e.g., a lifting column is provided. The robot arm comprises an electromechanical drive 3. The electromechanical drive 3 is configured to drive the single arms 2', 2'' of the robot arm. Alternatively, a hydraulic drive is provided for driving the robot arms 2', 2''. In a further alternative embodiment, several drives 3 for respectively driving one of the single arms 2', 2'' are provided.

The patient transfer system 1 is further provided with a running gear 4 attached to the lifting mechanism 2 for moving the patient transfer system 1. As illustrated in FIG. 1 by means of the direction signs 5, the patient transfer system 1 can be moved in any arbitrary horizontal direction by the running gear 4. The running gear 4 comprises a drive mechanism 6 for moving the patient transfer system 1. Alternatively, the running gear 4 is not provided with the drive and the patient transfer system 1 is to be moved manually. In a further alternative embodiment, the patient transfer system 1 is not provided with a running gear 4 but is fixedly attached, e.g., to a wall or to a column on a floor.

Furthermore, the patient transfer system 1 is provided with an actuator unit 7 attached to the lifting mechanism 2. At the actuator unit 7, two conveyors 8, 8' are attached such that they extend from the actuator unit 7 in a forklift fork-like manner. The forklift fork-like manner of attaching the conveyors 8, 8' to the actuator unit 7 provides the two conveyors 8, 8' such that they are disposed in a parallel or almost parallel arrangement. Furthermore, they extend from the actuator unit 7 in a horizontal or almost horizontal direction.

The conveyors 8, 8' accommodate a patient P who is lying on a patient support 10. In FIG. 1, a state of the patient P already lifted from the patient support 10 by the patient support system 1 is shown.

Moreover, the conveyors 8, 8' respectively comprise a support structure 9 for carrying and guiding the conveyor belts 11 and for attaching the conveyors 8, 8' to the actuator unit 7.

Figure 2:
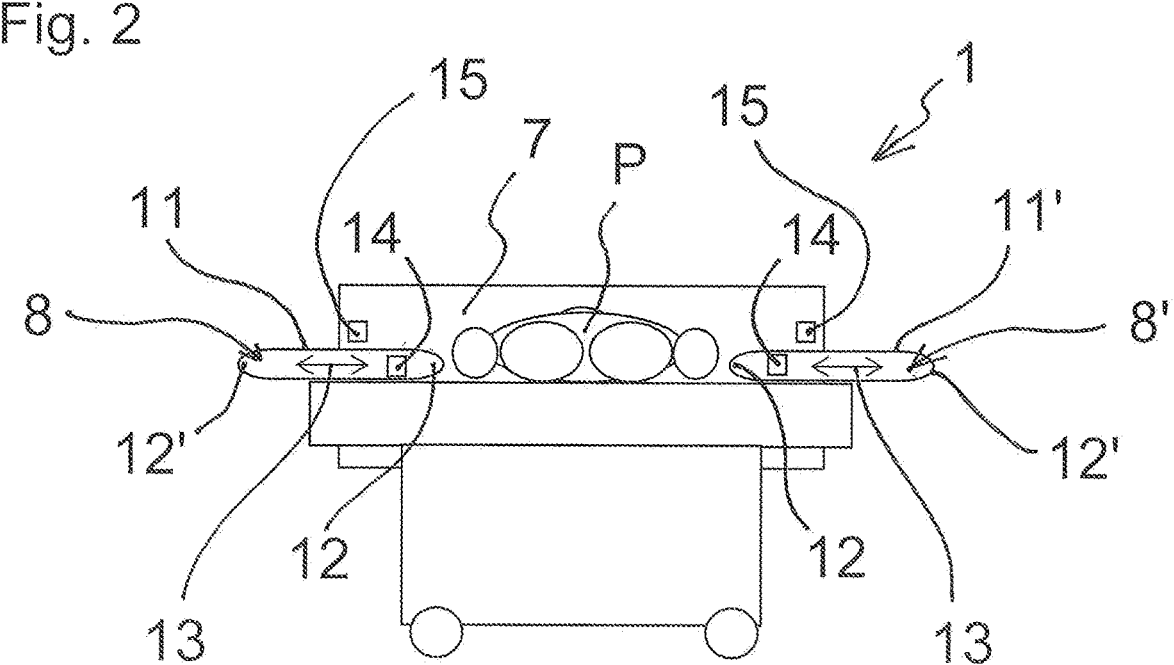
FIG. 2 shows a front view of a principle illustration of a first embodiment of the patient transfer system of FIG. 1 in a first state.

FIG. 2 shows a front view of the principle illustration of the first embodiment of the patient transfer system 1 of FIG. 1 in a first state. The first state corresponds to positions of the conveyors 8, 8' moved apart from each other.

The conveyors 8, 8' respectively have the conveyor belt 11, 11' for conveying the patient P onto the conveyors 8, 8'. The conveyor belts 11, 11' are formed of a material permeable to x-rays. The support structures 9, shown in FIG. 1, at least in the region of the conveyor belts 11, 11', are formed of a material permeable to x-rays. In an alternative embodiment, if not absolutely necessary, the conveyor belt 11, 11' and the support structure 9 are made of materials not being permeable to x-rays.

The conveyors 8, 8' respectively also have opposite reversing ends 12, 12' reversing the conveyor belt 11. The reversing ends 12 of the conveyors 8, 8' are facing each other and the reversing ends 12' are averted from each other. The actuator unit 7 is configured to move the conveyors 8, 8' such that the reversing ends 12 facing each other are linearly moved towards and apart from each other in motion directions as shown by the double arrows 13.

The patient transfer system 1 further comprises drive devices 14 respectively driving the conveyor belts 11, 11' in respective conveying directions opposite to each other. In an alternative embodiment, the patient transfer system 1 is provided with only one device 14 driving both of the conveyor belts 11, 11'.

Furthermore, the patient transfer system 1 comprises sensors 15 for detecting positions of the conveyors 8, 8' in a state moved apart from each other. These positions can be end positions of the way of the conveyors 8, 8' apart from each other or, alternatively, they can be positions not being end positions of the conveyors 8, 8' but ensuring that a distance between the conveyors 8, 8' is sufficient for providing a space for the patient P without touching the patient P by the conveyors 8, 8'. Alternatively, only one sensor 15 is provided for detecting these positions of the conveyors 8, 8'.

Figure 3:
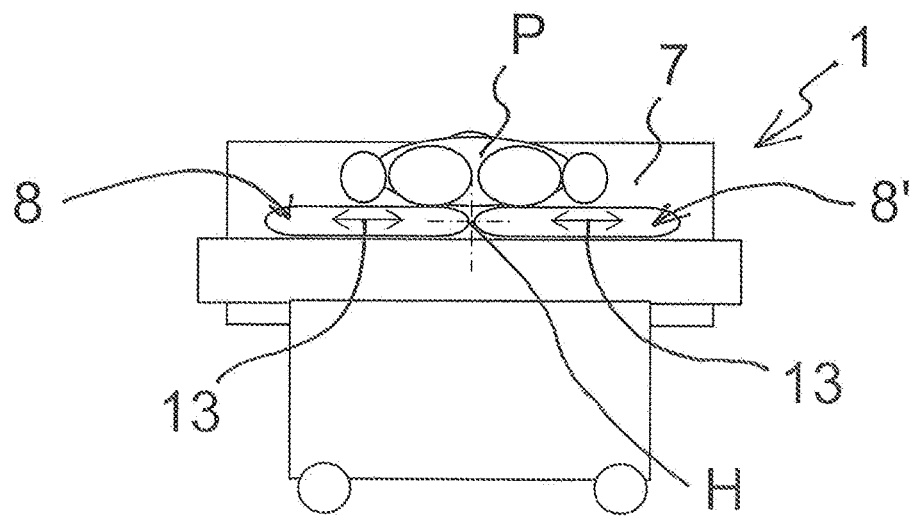
FIG. 3 shows a front view of a principle illustration of the first embodiment of the patient transfer system of FIG. 1 in a second state.

FIG. 3 shows a front view of a principle illustration of the first embodiment of the patient transfer system 1 of FIG. 1 in a second state. The second state corresponds to positions of the conveyors 8, 8' moved to each other, wherein the patient P is accommodated on the conveyors 8, 8'.

Moreover, the actuator unit 7 is attached to the lifting mechanism 2 (not shown in FIG. 2) in a manner being rotatable around a horizontal axis H perpendicular to the motion directions, shown by double arrows 13, of the conveyors 8, 8' towards and apart from each other.

Figure 4:
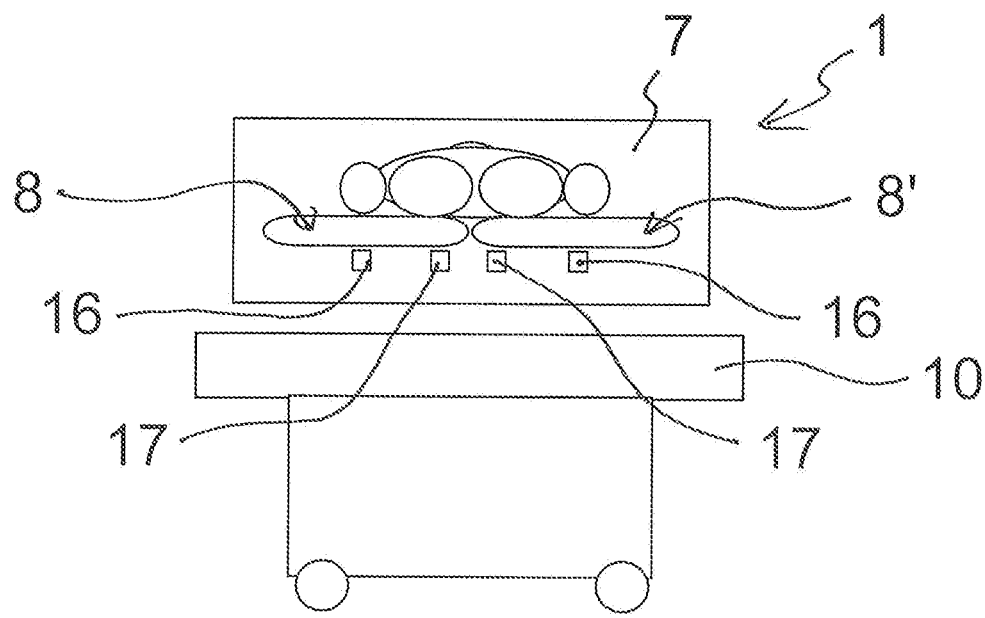
FIG. 4 shows a front view of a principle illustration of the first embodiment of the patient transfer system of FIG. 1 in a third state.

FIG. 4 shows a front view of a principle illustration of the first embodiment of the patient transfer system 1 of FIG. 1 in the third state. The third state corresponds to a position of the actuator unit 7 and the conveyors 8, 8' in a lifted state so that the patient P accommodated on the conveyors 8, 8' is lifted with respect to the patient support 10.

The actuator unit 7 comprises locking devices 16 for locking the conveyors 8, 8' in positions moved towards each other. The position moved towards each other can be an end position of a way of the conveyors or, alternatively, a position of the conveyors ensuring that there is no risk that a patient P falls through or is squeezed in a gap between the conveyors. Alternatively, in connection with a specific coupling for moving the conveyors 8, 8' towards and apart from each other, only one locking device 16 can be provided. In a further alternative embodiment, a drive (not shown) for moving the conveyors 8, 8' to each other and apart from each other is self-locking so that the locking device 16 is not provided. In yet another alternative embodiment, locking devices for locking the conveyors in a state moved apart from each other are additionally or alternatively provided.

The patient transfer system 1 comprises sensors 17 for detecting positions of the conveyors 8, 8' in a state moved towards each other. The position moved towards each other for being detected is also defined as above concerning the lockable position. Alternatively, in connection with the specific coupling of the conveyors 8, 8' for moving the conveyors 8, 8' towards each other and apart from each other, only one sensor 17 detecting positions of the conveyors 8, 8' in the state moved towards each other is possible. In a further alternative embodiment, the sensor 17 can also be integrated in the drive device (not shown) for moving the conveyors 8, 8' towards each other and apart from each other.

Figure 5:
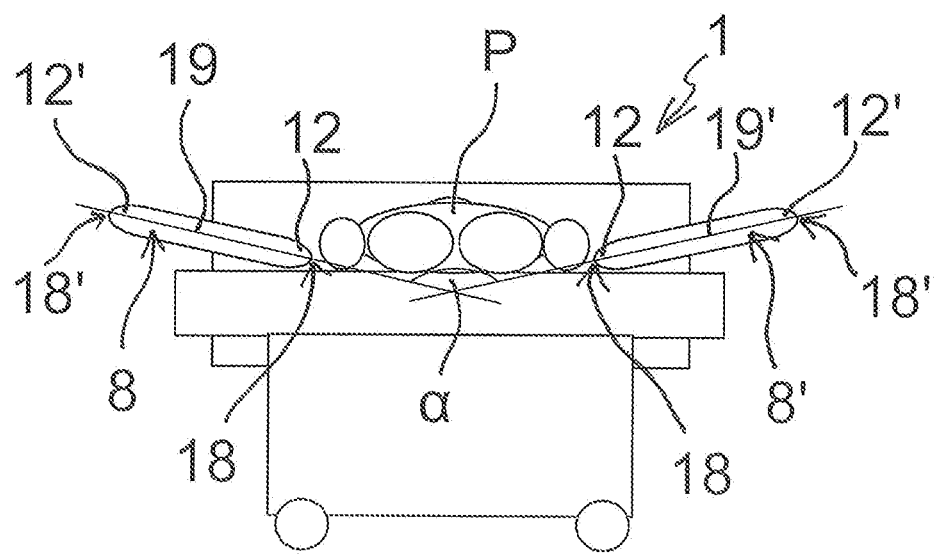
FIG. 5 shows a front view of a principle illustration of a second or third embodiment of the patient transfer system of FIG. 1 in a first state.

FIG. 5 shows a front view of a principle illustration of a second or third embodiment of the patient transfer system of FIG. 1.

The reversing ends 12, 12 of the conveyors 8, 8' respectively have an apex line 18, 18'. The apex line 18 of one of the reversing ends 12 facing each other and the apex line 18' of one of the reversing ends 12' averted from each other of one of the conveyors 8, 8' respectively form a conveyor plane 19, 19' of one of the conveyors 8, 8'. The conveyor planes 19, 19' encompass an obtuse angle a on a side accommodating the patient P. The provision of the obtuse angle a can be done by providing a fixed angle of the conveyor planes 19, 19' with respect to the actuator unit. Alternatively, the obtuse angle α can be provided by flexibly adjusting an angle of the conveyor planes.

Figure 6:
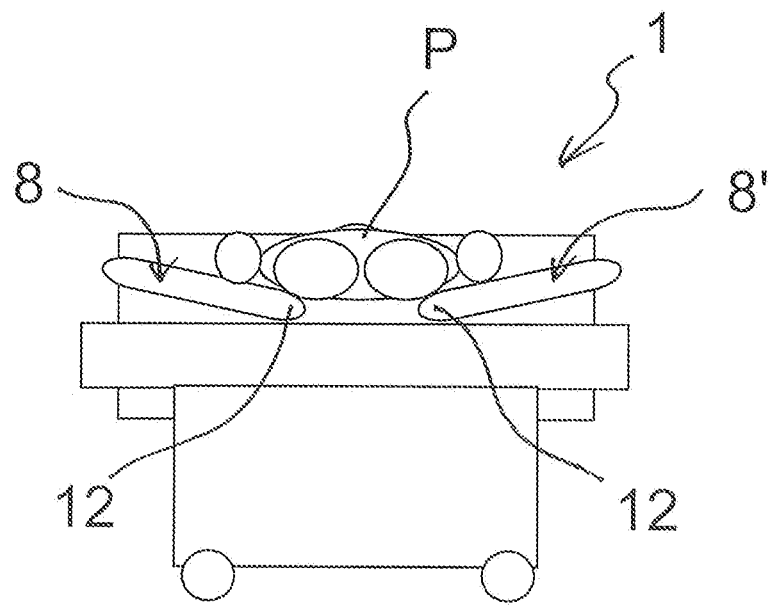
FIG. 6 shows a front view of a principle illustration of the second embodiment of the patient transfer system of FIG. 5 in a second state.

FIG. 6 shows a front view of a principle illustration of the second embodiment of the patient transfer system 1 of FIG. 5 in a second state. The second state corresponds to positions of the conveyors 8, 8' partially moved to each other, wherein the patient P is accommodated on the conveyors 8, 8'.

In this embodiment, the conveyors 8, 8' are supported such that the reversing ends 12 facing each other of the conveyors 8, 8 are linearly moved towards each other in a horizontal direction.

Figure 7:
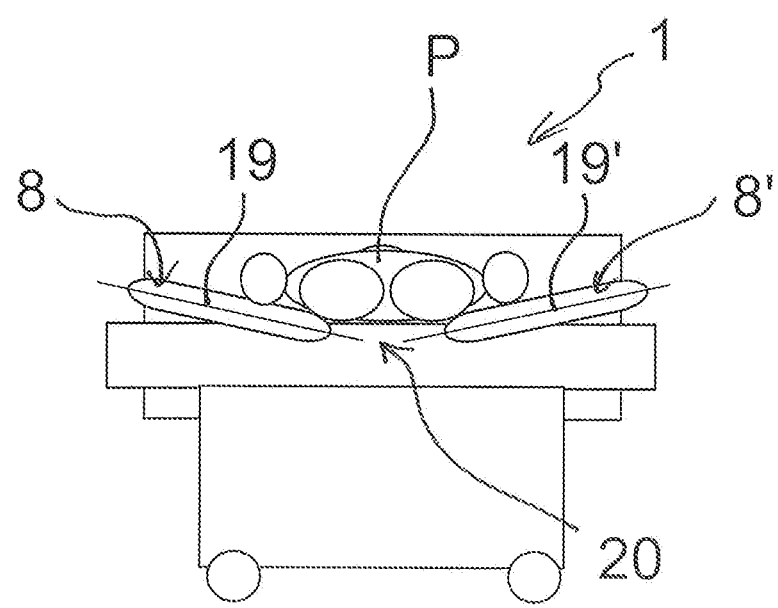
FIG. 7 shows a front view of a principle illustration of the third embodiment of the patient transfer system of FIG. 5 in a second state.

FIG. 7 shows a front view of the principle illustration of the third embodiment of the patient transfer system 1 of FIG. 5 in a second state. The second state corresponds to positions of the conveyors 8, 8' partially moved towards each other, wherein the patient P is accommodated on the conveyors 8, 8'.

The conveyors 8, 8' are supported such that they are movable parallel to the respective conveyor plane 19, 19' to perform the linear movement of the reversing ends 12 facing each other to each other and apart from each other. Alternatively, the conveyors 8, 8' can be moved on a curved way as long as the reversing end 12 facing each other are moved to each other and apart from each other in a linear manner.

In use, firstly, the conveyors 8, 8' are placed beside the patient P. Then, the reversing ends 12 facing each other of the conveyors 8, 8' are moved horizontally to each other by the actuator unit 11. Thereby, the conveyors 8, 8 insert in a space between the patient P and the patient support 10 and convey the patient P onto the conveyor belts 11, 11'. Preferably, the conveyors 8, 8' do not lie on the patient support 10 but have a distance such that there is no or small friction between the patient support 10 and the conveyor belts 11, 11'. Thus, the motion of the conveyor belts 11, 11' is not or little influenced by a contact with the patient support 10 so that the conveyor belts 11, 11' can freely move by the friction between the patient's body and the conveyor belts 11, 11' according to the motion of the conveyors 8, 8' towards each other. Optionally, the conveyor belts 11, 11 are driven in a conveying direction having a horizontal component opposite to a horizontal motion component of the motion of the respective conveyor 8, 8' by a drive device 14.

In one of the embodiments, the conveyors 8, 8' move parallel to the respective conveyor plane 19, 19' formed by the apex line 18 of one of the reversing ends 12 facing each other and the apex line 18' of one of the reversing ends 12' averted from each other of the conveyors 8, 8', wherein, towards the space 20 between the conveyors 8, 8', the conveyor planes 19, 19' are downwardly directed (see FIG. 7).

Subsequently, the actuator unit 7 and, therefore, the conveyors 8, 8', are lifted by the lifting mechanism 2.

Then, the patient transfer system 1 is moved to another patient support 10 or the patient support 10 is exchanged.

Next, the actuator unit 7, and, therefore, the conveyors 8, 8' are lowered until, preferably, a small distance between the conveyors 8, 8' and the patient support 10 remains and the conveyors 8, 8' move apart from each other by the actuator unit 7. Thereby, the conveyors 8, 8' are removed from the space between the patient P and patient support 10 and the patient P is conveyed from the conveyor belts 11, 11'.

The invention has been described in conjunction with various embodiments herein. However, other variations to the disclosed embodiments can be understood and effected by those skilled in the art in practicing the claimed invention, from the study of the drawings, the disclosure and dependent claims. In the claims, the word "comprising" does not exclude other elements or steps, and the indefinite article "a" or "an" does not exclude a plurality.

The invention claimed is:

1. A patient transfer system comprising a lifting mechanism, an actuator unit attached to the lifting mechanism, and two conveyors attached to the actuator unit such that they extend from the actuator unit in a forklift fork-like manner, the conveyors respectively having a conveyor belt and opposite reversing ends reversing the conveyor belt, wherein the actuator unit is configured to move the conveyors such that the reversing ends facing each other are linearly movable towards and apart from each other, wherein each of the conveyors form a respective conveyor plane, each conveyor plane having an apex line, wherein each of the conveyors are configured to be moved: towards each other with respect to each apex line, away from each other with respect to each apex line, and at an obtuse angle with respect to each apex line.

2. The patient transfer system of claim 1, wherein the patient transfer system comprises a drive device driving the two conveyor belts in respective conveying directions opposite to each other.

3. The patient transfer system of claim 1, wherein the actuator unit comprises a locking device for locking the conveyors in positions in a state after being moved towards each other.

4. The patient transfer system of claim 1, wherein the patient transfer system comprises a sensor for detecting positions of the conveyors in a state after being moved towards each other.

5. The patient transfer system of claim 1, wherein the patient transfer system comprises a sensor for detecting positions of the conveyors in a state after being moved apart from each other.

6. The patient transfer system of claim 1, wherein the actuator unit is attached to the lifting mechanism in a manner rotatable around a horizontal axis perpendicular to motion directions towards each other and apart from each other of the reversing ends of the conveyors facing each other.

7. The patient transfer system of claim 1, wherein the conveyors respectively comprise a support structure, and the conveyor belt and the support structure, at least in the region of the conveyor belt, are made of a material permeable to X-rays.

8. The patient transfer system of claim 1, wherein the patient transfer system comprises a running gear, attached to the lifting mechanism for moving the patient transfer system.

9. The patient transfer system of claim 8, wherein the running gear comprises a drive mechanism for moving the patient transfer system.

10. The patient transfer system of claim 1, wherein the lifting mechanism comprises a robot arm.

11. The patient transfer system of claim 10, wherein the robot arm comprises an electromechanical drive or a hydraulic drive.

12. A method for operating a patient transfer system of claim 1, comprising the steps:
placing the conveyors beside a patient;
moving the reversing ends facing each other of the conveyors horizontally to each other by the actuator unit, thereby inserting the conveyors in a space between the patient and a patient support and conveying the patient onto the conveyor belts;
lifting the actuator unit by the lifting mechanism,
moving the patient transfer system to another patient support or exchanging the patient support,
lowering the actuator unit by the lifting mechanism, and
moving the conveyors apart from each other by the actuator unit, thereby removing the conveyors from the space between the patient and the patient support and conveying the patient from the conveyor belts.

13. The method of claim 12, wherein the step:
moving the reversing ends facing each other of the conveyors horizontally to each other by the actuator unit, thereby inserting the conveyors in a space between the patient and a patient support and conveying the patient onto the conveyor belts, is performed by moving the conveyors parallel to a respective conveyor plane formed by apex lines of one of the reversing ends facing each other and apex lines of one of the reversing ends averted from each other of one of the conveyors,
wherein, towards a space between the conveyors, the conveyor planes are downwardly directed.

14. The method of claim 12, including the step of: driving the conveyor belts by a drive device in conveying directions having a horizontal component opposite to the horizontal motion component of the motion of the respective conveyor.

* * * * *